(12) United States Patent
Yamada

(10) Patent No.: US 12,464,287 B2
(45) Date of Patent: Nov. 4, 2025

(54) IMAGE PICKUP APPARATUS

(71) Applicant: CANON KABUSHIKI KAISHA, Tokyo (JP)

(72) Inventor: Yohei Yamada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/453,558

(22) Filed: Aug. 22, 2023

(65) Prior Publication Data

US 2024/0073607 A1    Feb. 29, 2024

(30) Foreign Application Priority Data

Aug. 30, 2022   (JP) ................. 2022-137233

(51) Int. Cl.
| | | |
|---|---|---|
| *H04N 23/51* | (2023.01) | |
| *H04N 23/50* | (2023.01) | |
| *H04R 5/027* | (2006.01) | |
| *G03B 31/00* | (2021.01) | |
| *H04R 1/02* | (2006.01) | |

(52) U.S. Cl.
CPC ............. *H04R 5/027* (2013.01); *H04N 23/50* (2023.01); *H04N 23/51* (2023.01); *G03B 31/00* (2013.01); *H04R 1/028* (2013.01)

(58) Field of Classification Search
CPC ........ H04N 23/50; H04N 23/51; G03B 17/02; G03B 31/00; H04R 1/02; H04R 1/028; H04R 5/027; H04R 2201/003; H04R 2410/07
See application file for complete search history.

(56) References Cited

U.S. PATENT DOCUMENTS

| | | | |
|---|---|---|---|
| 2003/0161484 A1* | 8/2003 | Kanamori | H04R 3/005 381/71.7 |
| 2012/0257779 A1* | 10/2012 | Kimura | H04R 3/00 381/359 |
| 2018/0063617 A1* | 3/2018 | Ohtsuka | H04R 1/08 |

FOREIGN PATENT DOCUMENTS

JP    2012-195922 A    10/2012

* cited by examiner

*Primary Examiner* — Daniel M Pasiewicz
(74) *Attorney, Agent, or Firm* — Cowan, Liebowitz & Latman, P.C.

(57) ABSTRACT

An image pickup apparatus is configured to record sound. The image pickup apparatus includes a housing unit, a first microphone and a second microphone configured to acquire stereophonic sound, and disposed at positions laterally separated from each other, and a third microphone separate from the first microphone and the second microphone. The housing unit includes a first storing unit and a second storing unit separated from each other. The first microphone is disposed in the first storing unit. The second microphone and the third microphone are disposed in the second storing unit.

20 Claims, 4 Drawing Sheets

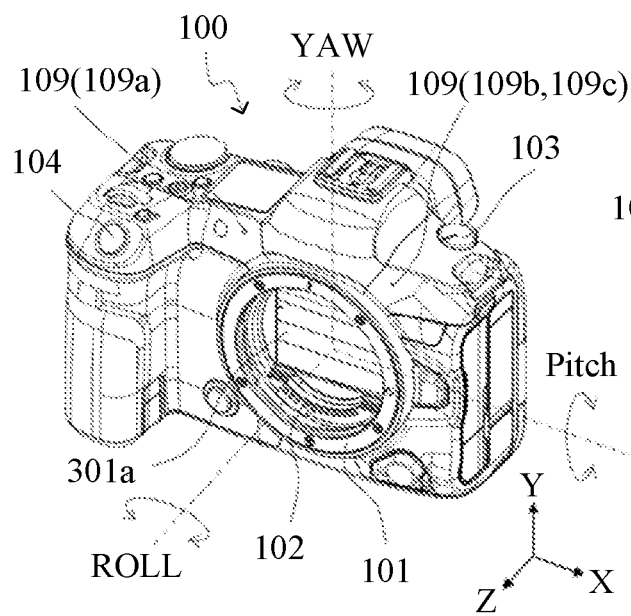
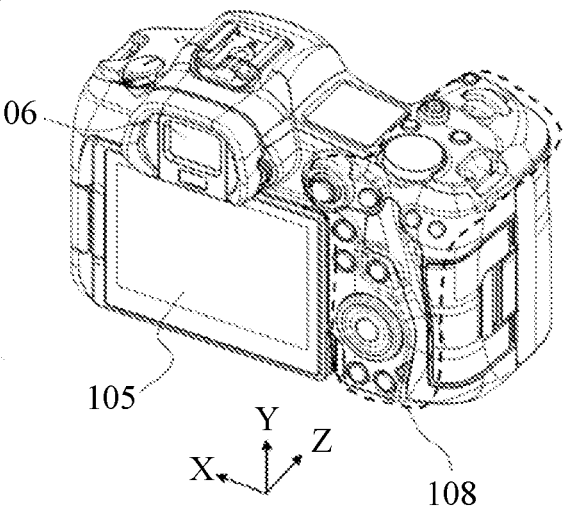
FIG. 2A
FIG. 2B
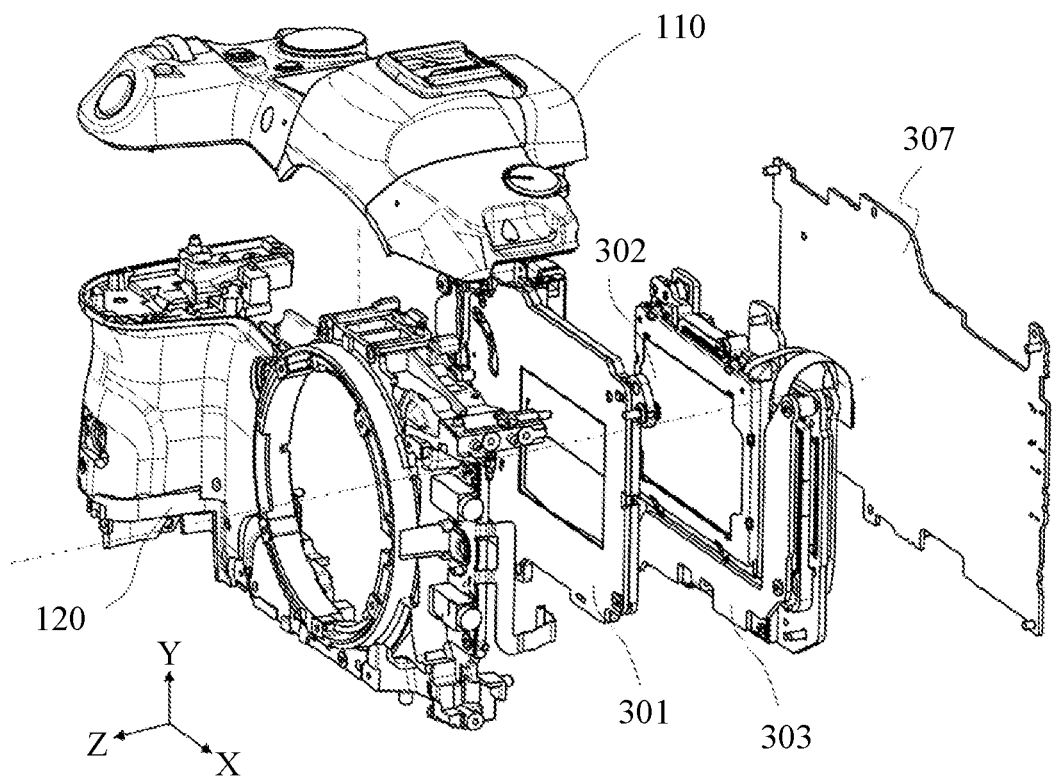
FIG. 3

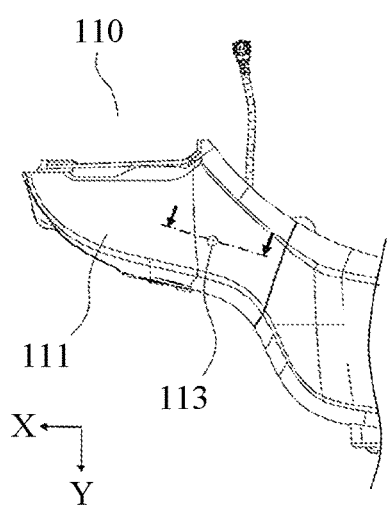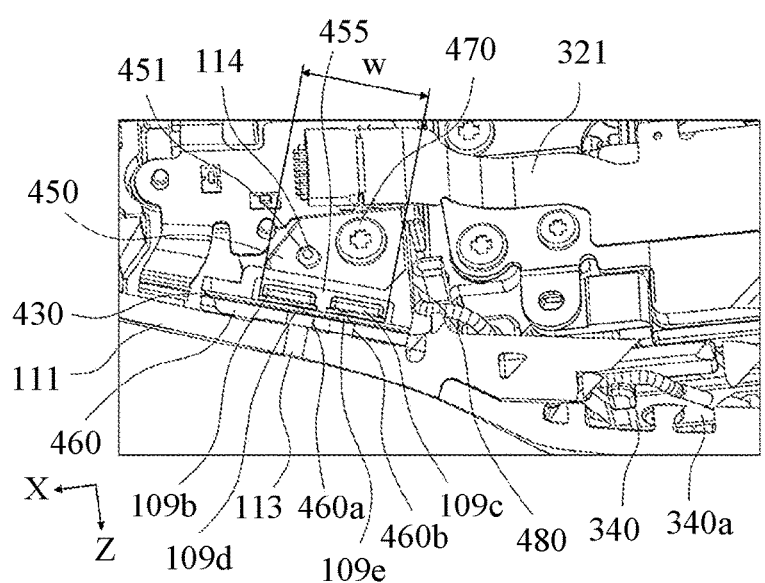
FIG. 6A
FIG. 6B

IMAGE PICKUP APPARATUS

BACKGROUND

Technical Field

One of the aspects of the embodiments relates to an image pickup apparatus that can record sound.

Description of Related Art

Some image pickup apparatuses such as video cameras and digital cameras have two microphones for acquiring stereophonic sound, and some image pickup apparatuses perform processing such as high-quality sound production and noise reduction for a stereophonic sound signal using a signal from a microphone provided separately from these stereophonic microphones.

Japanese Patent Laid-Open No. 2012-195922 discloses an image pickup apparatus that includes first and second microphones for acquiring stereophonic sound in a camera body (first housing), and a third microphone in a strobe unit (second housing) that can change orientation relative to the camera body.

The image pickup apparatus disclosed in Japanese Patent Laid-Open No. 2012-195922 includes the third microphone in the second housing different from the first housing for holding the first and second microphones, and thus has a complicated structure because a holding member dedicated to the third microphone is required. In addition, since the vibration transmitted to the third microphone in the second housing is different from the vibration transmitted to the first and second microphones in the first housing, complicated adjustment may be necessary or the processing effect may be insufficient in processing the stereophonic sound signal using the signal obtained from the third microphone.

SUMMARY

An image pickup apparatus according to one aspect of the disclosure is configured to record sound. The image pickup apparatus includes a housing unit, a first microphone and a second microphone configured to acquire stereophonic sound, and disposed at positions laterally separated from each other, and a third microphone separate from the first microphone and the second microphone. The housing unit includes a first storing unit and a second storing unit separated from each other. The first microphone is disposed in the first storing unit. The second microphone and the third microphone are disposed in the second storing unit.

Further features of the disclosure will become apparent from the following description of embodiments with reference to the attached drawings.

BRIEF DESCRIPTION OF THE DRAWINGS

FIGS. 2A and 2B are external perspective views of the camera according to this embodiment.

FIG. 3 is an exploded perspective view of the camera according to this embodiment.

FIGS. 6A and 6B are partially enlarged views near a microphone in the top cover unit.

DESCRIPTION OF THE EMBODIMENTS

Referring now to the accompanying drawings, a description will be given of embodiments according to the disclosure.

Figure 1:
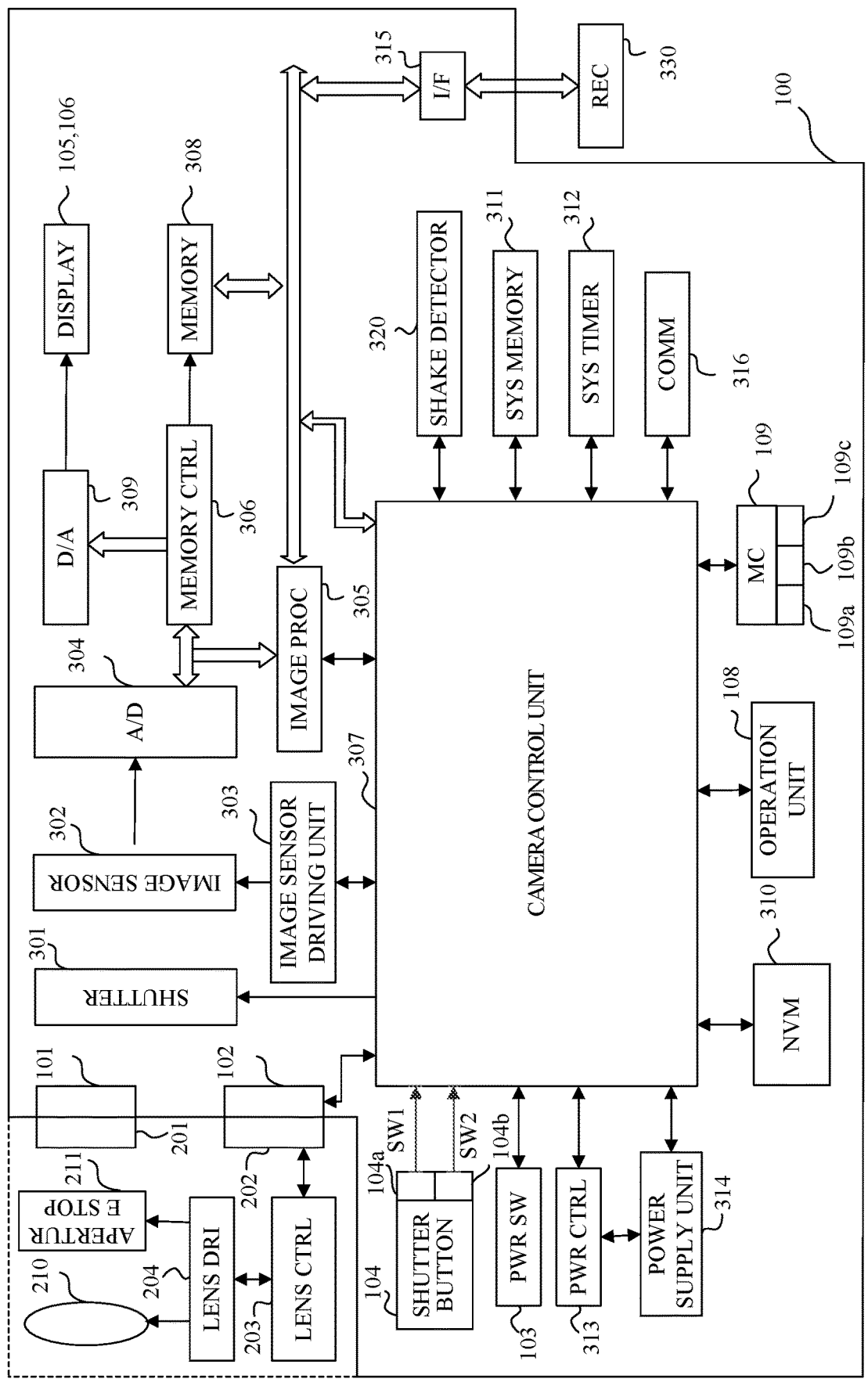
FIG. 1 is a block diagram illustrating a configuration of a camera according to this embodiment.

FIG. 1 illustrates a configuration of a camera 100 as an image pickup apparatus according to this embodiment. FIGS. 2A and 2B illustrate the appearances of the camera 100 obliquely viewed from the front and obliquely viewed from the rear. In FIGS. 2A and 2B, a Z-axis direction indicates the front side when viewed from the rear side of the camera 100, an X-axis direction indicates the left side when viewed from the rear side of the camera 100, and a Y-axis direction indicates the upper side when viewed from the rear side of the camera 100.

The camera 100 according to this embodiment is a lens interchangeable type camera in which a lens unit 200 is attachable and detachable. The lens unit 200 having an imaging optical system including a lens 210 and an aperture stop (diaphragm) 211 is attached to the camera 100 by engaging a mount 201 of the lens unit 200 with a mount 101 provided on the camera 100. The lens unit 200 and the camera 100 can communicate with each other by connecting a connector 202 provided on the mount 201 and a connector 102 provided on the camera 100. For example, a lens control unit 203 provided in the lens unit 200 controls a lens driving unit 204 based on a signal transmitted from a camera control unit 307 provided in the camera 100, thereby driving the aperture stop 211 to adjust a light amount and driving the lens 210 focusing and zooming.

The camera 100 can record a still image, a moving image, and sound. In the camera 100, a focal plane shutter 301 is disposed between the lens unit 200 (imaging optical system) and an image sensor 302, and shields light from the imaging optical system to the image sensor 302 in a non-imaging state. The focal plane shutter 301 opens shutter blades 301a (FIG. 2A) in accordance with the control of the camera control unit 307 during imaging and live-view image display so as to capture an optical image formed by the light from the imaging optical system, onto the image sensor 302. The image sensor 302 is a photoelectric conversion element including a CCD sensor, a CMOS sensor, or the like that converts an optical image into an electrical signal.

An analog-to-digital (A/D) converter 304 converts an analog imaging signal output from the image sensor 302 into a digital imaging signal (image data). An image processing unit 305 performs image processing such as pixel interpolation, resizing processing, and color conversion processing for the image data from the A/D converter 304 or the image data from a memory control unit 306. The image processing unit 305 also performs calculation processing using image data and outputs the calculation result to the camera control unit 307. The camera control unit 307 performs auto-exposure control (AE), autofocus control (AF), and auto-white balance (AWB) processing based on the calculation result from the image processing unit 305.

The image data from the A/D converter 304 is written into the memory 308 via the memory control unit 306. A memory 308 stores image data from the A/D converter 304 for display on a finder display unit 105 or a rear display unit 106. The finder display unit 105 and the rear display unit 106 include a display device such as an LCD and its driving circuit. A digital-to-analog (D/A) converter 309 converts the image data stored in the memory 308 into an analog image signal and supplies it to the finder display unit 105 or the rear display unit 106. Thereby, the finder display unit 105 or the rear display unit 106 displays a live-view image or a captured image obtained through the image sensor 302. The rear display unit 106 has a built-in capacitive or pressure-sensitive touch sensor, and the user can instruct various operations by touching the screen with a finger or the like.

A nonvolatile memory 310 is a recording medium such as electrically erasable/recordable EEPROM. The nonvolatile memory 310 stores constants, programs, and the like for operation of the camera control unit 307.

The camera control unit 307 includes a computer having at least one processor, and controls the camera 100 and the lens unit 200 according to an instruction signal from an operation unit 108. The operation unit 108 includes a plurality of operation members such as a power switch 103, a shutter button 104, and other buttons, a dial, and the touch sensor of the rear display unit 106, and outputs an instruction signal to the camera control unit 307 when operated by the user.

A system memory 311 includes a RAM, stores constants and variables for operations of the camera control unit 307, and expands programs and the like read out of the nonvolatile memory 310. The camera control unit 307 also performs display control by controlling the memory 308, the D/A converter 309, the finder display unit 105, the rear display unit 106, and the like. A system timer 312 measures the time used for various controls and the time of a built-in clock.

The camera 100 is powered on and off by operating the power switch 103. A first shutter switch 104a is turned on by half-pressing the shutter button 104, and generates a first shutter switch signal SW1. The camera control unit 307 starts processing such as AE, AF, and AWB in response to input of the first shutter switch signal SW1. A second shutter switch 104b is turned on by fully pressing the shutter button 104, and generates a second shutter switch signal SW2. The camera control unit 307 opens and closes the focal plane shutter 301 in response to the input of the second shutter switch signal SW2, and performs a series of imaging processing from signal reading from the image sensor 302 to writing of image data into the recording medium 330.

A power control unit 313 includes a battery detection circuit, a DC-DC converter, a switch circuit that switches between energization blocks, etc., and detects whether or not a battery is installed, the type of the installed battery, and a remaining amount. The power control unit 313 controls the DC-DC converter based on the result of detection of the battery type and remaining amount and an instruction from the camera control unit 307 to supply a predetermined voltage to each unit including the recording medium 330.

A power supply unit 314 includes a primary battery, a secondary battery, an AC adapter, or the like. A recording medium OF 315 is an interface with the recording medium 330 such as a memory card or hard disk drive. The recording medium 330 is a recording medium such as a memory card for recording captured images, and includes a semiconductor memory, an optical disc, a magnetic disk, or the like.

A communication unit 316 is connected to an external device wirelessly or by a wired cable, and transmits and receives an image signal (live-view and captured images), audio signals, etc. to and from the external device. The communication unit 316 can also be connected to a wireless LAN (Local Area Network) or the Internet.

A shake detector 320 includes a gyro sensor or the like, and outputs a shake signal according to a shake amount of the camera 100 in pitch, yaw, and roll directions.

The camera control unit 307 performs optical shake correction by moving (shifting) the image sensor 302 in a direction orthogonal to the imaging optical axis through an image sensor driving unit 303 according to the shake signal from the shake detector 320. The image processing unit 305 performs electronic shake correction by shifting a cutout area as an effective area in the image data under the control of the camera control unit 307.

A microphone unit 109 includes three Micro Electro Mechanical Systems (MEMS) microphone elements. A Rch microphone 109a as a first microphone is disposed in the −X direction from (on the right side of) the imaging optical axis (optical axis of the imaging optical system) of the camera 100 inside the top cover unit described below. A Lch microphone 109b as a second microphone is disposed in the +X direction from (on the left side of) the imaging optical axis. The Rch microphone 109a and the Lch microphone 109b are horizontally separated from each other and used as microphones for acquiring stereophonic sound (stereophonic microphones). The camera control unit 307 records stereophonic sound signals output from the Rch microphone 109a and the Lch microphone 109b and a moving image in the moving image capturing or the like.

An NC microphone 109c as a third microphone is disposed near the Lch microphone 109b inside the top cover unit and at a position closer to the imaging optical axis than the Lch microphone 109b. In this embodiment, the NC microphone 109c is used for a noise canceling function of the camera control unit 307. The camera control unit 307 performs signal processing (noise canceling processing) to partially cancel the audio signals output from the Rch microphone 109a and the Lch microphone 109b using the stereophonic sound signal output from the NC microphone 109c. For example, this configuration can reduce a component of a driving sound (noise) of the lens 210 generated from the lens unit 200 and included in the stereophonic sound signal during moving image capturing. As described, this embodiment disposes the NC microphone 109c near the Lch microphone 109b and on the imaging optical axis side, so that the NC microphone 109c is closer to the lens unit 200 than the Lch microphone 109b. This configuration enables the driving sound from the lens unit 200 to be easily transmitted to the NC microphone 109c through the camera 100, and easily achieve the effect of the noise canceling processing. In this embodiment, the NC microphone 109c is disposed on the opposite side (left side) of the operation unit 108 with respect to the imaging optical axis and the Rch microphone 109a. Thereby, the operation sound from the operation unit 108 becomes less likely to enter the NC microphone 109c, and eliminates the need to perform processing for reducing the component of the operation sound on the audio signal from the NC microphone 109c.

FIG. 3 is an exploded view of the camera 100 from which front, back, and bottom exterior members have been removed. A base plate 120 is a structure responsible for the strength of the camera 100. The focal plane shutter 301, the image sensor 302, the image sensor driving unit 303, the camera control unit 307, and a top cover unit 110 as a housing unit are fastened to the base plate 120 with unillustrated screws.

Figure 4:
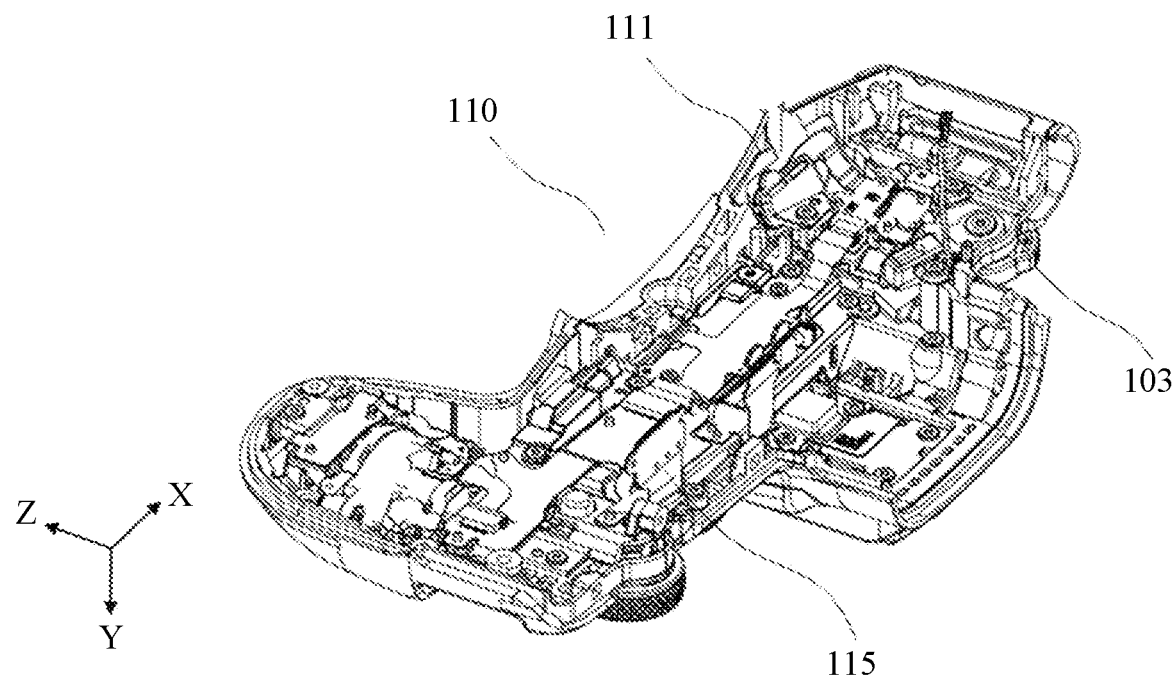
FIG. 4 is a perspective view illustrating an internal structure of a top cover unit of the camera according to this embodiment.
Figure 5:
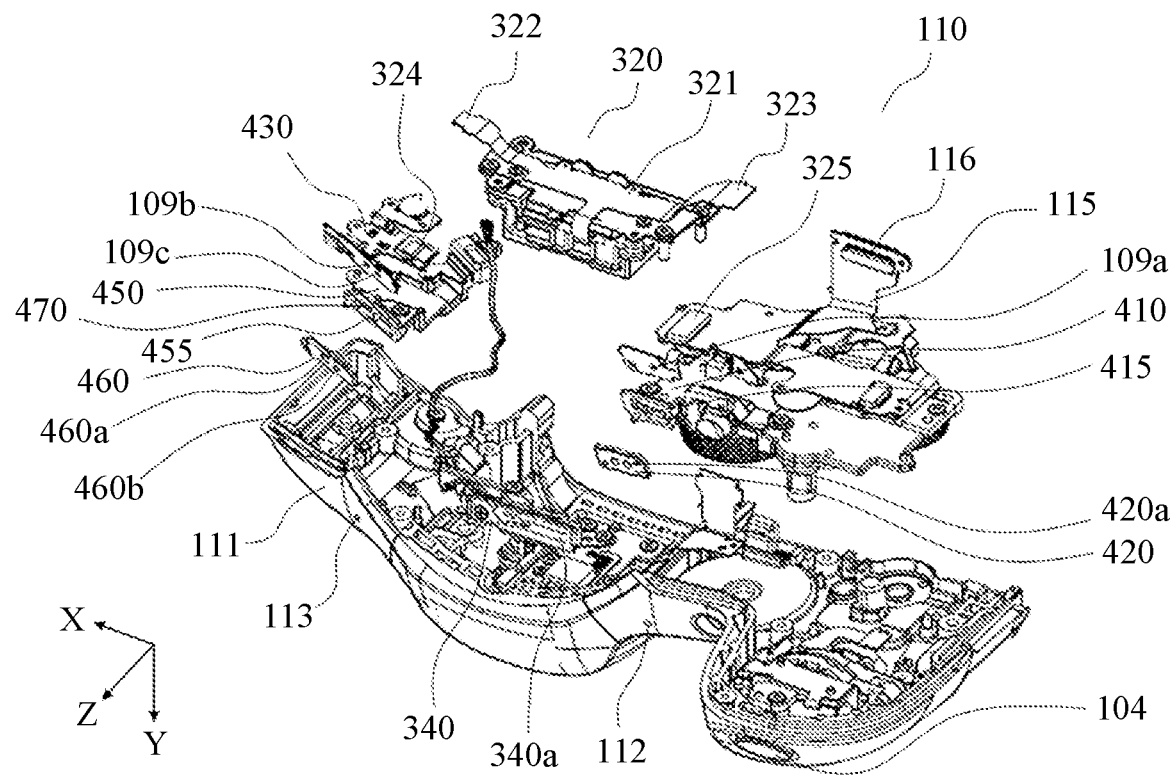
FIG. 5 is an exploded perspective view of the top cover unit.

FIG. 4 illustrates the internal structure of the top cover unit 110 viewed from the bottom side, and FIG. 5 illustrates the exploded top cover unit 110. The top cover unit 110 has a top cover member 111 as a housing (exterior member) that covers a top surface of the camera 100. Inside the top cover member 111 are disposed the power switch 103, the shutter button 104, the shake detector 320, the wireless antenna substrate 340, and a top cover unit substrate 115, which are assembled with illustrated screws.

An electric circuit is formed on the top cover unit substrate 115 for outputting signals from the operation unit 108, the microphone unit 109 (109a, 109b, and 109c) and the like to the camera control unit 307. The top cover unit substrate 115 is electrically connected to the camera control unit 307 by a connector 116.

The top cover member 111 is made of resin. A first microphone hole 112 for Rch is formed in a front wall of the top cover member 111 penetrating from the exterior side to the inside at a position corresponding to the Rch microphone 109a. A second Lch microphone hole 113 for Lch is formed in the front wall portion of the top cover member 111 penetrating from the exterior side to the inside at a position corresponding to the Lch microphone 109b.

A first bushing 420 is made of an elastic material such as Ethylene Propylene Diene Methylene (EPDM) rubber, and has a first through hole 420a at a position corresponding to the first microphone hole 112 and the Rch microphone 109a. A second bushing 460 is made of an elastic material similar to that of the first bushing 420, and has a second through hole 460a at a position corresponding to the second microphone hole 113 and the Lch microphone 109b and a third through hole 460b at a position corresponding to the NC microphone 109c.

A first holding member 410 as a first member is made of resin and fixed to the top cover member 111 with unillustrated screws. The first holding member 410 has a first storing unit 415 for storing the Rch microphone 109a. The first storing unit 415 has a concave shape with an open exterior side.

The top cover unit substrate 115 is a flexible printed circuit (FPC) and is attached and fixed to the first holding member 410 with double-sided tape. The Rch microphone 109a is mounted on the top cover unit substrate 115 by soldering. Thereby, an audio signal output from the Rch microphone 109a is input to the camera control unit 307 through the top cover unit substrate 115.

A second holding member 450 as a second member is made of resin and fixed to the top cover member 111 with a screw (fastening member) 470. The second holding member 450 has a second storing unit 455 for storing the Lch microphone 109b and the NC microphone 109c. The second storing unit 455 has a concave shape with an open exterior side. The first holding member 410 (first storing unit 415) and the second holding member 450 (first storing unit 455) are disposed opposite to and apart from each other with respect to the imaging optical axis for acquiring stereophonic sound by the Rch microphone 109a and the Lch microphone 109b. The second holding member 450 is disposed opposite to the operation unit 108 with respect to the imaging optical axis and the first holding member 410. Thereby, the operation sound from the operation unit 108 becomes less likely to enter the NC microphone 109c as described above.

A microphone substrate 430 as one of the signal transmission substrates is an FPC and is attached and fixed to the second holding member 450 with double-sided tape. The Lch microphone 109b and the NC microphone 109c are mounted on the microphone substrate 430 by soldering. Thereby, audio signals output from the Lch microphone 109b and the NC microphone 109c are input to the camera control unit 307 through the microphone substrate 430, the relay substrate 321, and the top cover unit substrate 115, which will be described below.

In this embodiment, the Rch microphone 109a, the Lch microphone 109b and the NC microphone 109c are attached to the same top cover member 111 via the first holding member 410 and the second holding member 450. According to this configuration, the vibration of the camera 100 is similarly transmitted to the Rch microphone 109a, the Lch microphone 109b, and the NC microphone 109c. Therefore, in processing the stereophonic sound signals from the Rch microphone 109a and the Lch microphone 109b using the audio signal from the NC microphone 109c, it is unnecessary to adjust the audio signal from the NC microphone 109c, and the effect of the processing can be easily acquired. In addition, assembling the Lch microphone 109b and the NC microphone 109c into the same second holding member 450 (second storing unit 455) does not require a dedicated holding member for the NC microphone 109c, and can simplify the structure.

A relay substrate 321 as another signal transmission substrate is an FPC and has an electric circuit of the shake detector 320. A connection terminal 322 is provided at the end portion on the microphone substrate side extending from the relay substrate 321, and the connection terminal 322 is electrically connected to a microphone substrate connector 324. A connection terminal 323 is provided at the end portion on the top cover unit substrate side extending from the relay substrate 321, and the connection terminal 323 is electrically connected to a top cover unit substrate connector 325.

Due to the above configuration, audio signals output from the Rch microphone 109a, the Lch microphone 109b, and the NC microphone 109c are input to the camera control unit 307 through the microphone substrate 430, the relay substrate 321, and the top cover unit substrate 115. That is, audio signals from the Rch microphone 109a, the Lch microphone 109b, and the NC microphone 109c can be collectively input to the camera control unit 307. Thereby, each of the Rch microphone 109a, the Lch microphone 109b, and the NC microphone 109c does not have an individual signal transmission substrate, and thus the structure can become simplified. In addition, since the relay substrate 321 also serves as an electric circuit for the shake detector 320, no dedicated substrate for the electric circuit for the shake detector 320 is required.

The wireless antenna substrate 340 is made of a plate material made of a hard material such as glass epoxy resin. An antenna pattern 340a for wireless communication with an external device or the like is formed on the wireless antenna substrate 340. The wireless antenna substrate 340 radially emits radio waves in the +Z direction (forward) from the antenna pattern 340a. This embodiment provides the wireless antenna substrate 340 on the front side of the central portion of the top cover unit 110. Thereby, in a case where the user holds the camera 100 by hand or operates the operation unit 108, radio waves emitted from the wireless antenna substrate 340 are not blocked by the hand of the user, and good wireless communication performance can be obtained.

FIG. 6A illustrates an enlarged view near the Lch microphone 109b and the NC microphone 109c in the top cover unit 110. FIG. 6B is a sectional view taken along arrows in FIG. 6A, illustrating the Lch microphone 109b and the NC microphone 109c housed in the second storing unit 455.

The microphone substrate 430 is assembled into the front surface of the second holding member 450 so that the Lch microphone 109b and the NC microphone 109c are inserted into the second storing unit 455. The second bushing 460 is sandwiched between the microphone substrate 430 and the front wall of the top cover member 111. The second bushing 460 has the second through hole 460a at a position corresponding to the first sound hole 109d of the Lch microphone 109b. The second microphone hole 113 is formed in the front wall portion of the top cover member 111 at a position corresponding to the first sound hole 109d and the second through hole 460a. Sound (and voice) can be taken into the Lch microphone 109b through the second microphone hole 113, the second through hole 460a, and the first sound hole 109d.

The third through hole 460b is provided in the second bushing 460 at a position corresponding to the second sound hole 109e of the NC microphone 109c. However, no holes are formed in the front wall portion of the top cover member 111 at positions corresponding to the second sound hole 109e and the third through hole 460b. Due to this configuration, the NC microphone 109c can acquire sound propagating through the top cover member 111. In particular, the NC microphone 109c can easily acquire the driving sound of the lens 210 during moving image capturing through the top cover member 111.

The second holding member 450 is positioned relative to the top cover member 111 by the engagement between a positioning boss 114 provided on the top cover member 111 and a positioning hole 451 provided in the second holding member 450, and is fixed onto the top cover member 111 by the fastening member 470. In this embodiment, as illustrated in FIG. 6B, the fastening member 470 is provided near the second storing unit 455 and inside the arrangement width w of the Lch microphone 109b and the NC microphone 109c. Thereby, by tightening the fastening member 470 to the second holding member 450, the second bushing 460 is pressed against the top cover member 111 by the second holding member 450. At this time, the second bushing 460 is slightly compressed in the thickness direction and comes into contact with the top cover member 111. Thereby, the top cover member 111, the second bushing 460, the microphone substrate 430 on which the Lch microphone 109b and the NC microphone 109c are mounted, and the second holding member 450 including the second storing unit 455 are brought into close contact with each other. As a result, the Lch microphone 109b and the NC microphone 109c can satisfactorily acquire the intended sound. Since the above configuration can be realized with a single fastening member 470, the structure is simple.

Each of the Lch microphone 109b and the NC microphone 109c in this embodiment has a rectangular parallelepiped shape, and the first sound hole 109d and the second sound hole 109e are provided on one outer surface (front surface) of them. As illustrated in FIG. 6B, the first sound hole 109d and the second sound hole 109e are provided at positions shifted from the center in the longitudinal direction (the direction of the arrangement width w) on the front surface of the Lch microphone 109b and the NC microphone 109c. Adhering the surrounding portions of the first sound hole 109d and the second sound hole 109e on the front surface of the Lch microphone 109b and the NC microphone 109c to the second bushing 460 enables each of the Lch microphone 109b and the NC microphone 109c to satisfactorily acquire sound. To facilitate this effect, this embodiment provides the Lch microphone 109b and the NC microphone 109c on the microphone substrate 430 so that the first sound hole 109d and the second sound hole 109e are close to each other. In other words, the Lch microphone 109b is disposed so that its first sound hole 109d is located on the NC microphone side, and the NC microphone 109c is disposed so that its second sound hole 109e is located on the Lch microphone side.

Due to this arrangement, the surrounding portions of the first sound hole 109d and the second sound hole 109e can be brought into close contact with the second bushing 460 without being greatly affected by the manufacturing accuracy and assembly accuracy of parts around the Lch microphone 109b and the NC microphone 109c. Since the first sound hole 109d and the second sound hole 109e are close to each other, the above configuration can be realized with a single fastening member 470, and the structure is simple.

As described above, the wireless antenna substrate 340 radially emits radio waves in the +Z direction from the antenna pattern 340a. At this time, if radio waves emitted from the antenna pattern 340a are transmitted as electric noise to the NC microphone 109c, the microphone substrate 430, and the relay substrate 321 close to the wireless antenna substrate 340, noise may be included in the sound to be recorded.

Therefore, this embodiment provides the NC microphone 109c, the microphone substrate 430, and the relay substrate 321 in the −Z direction (backward) from the antenna pattern 340a, that is, on the side opposite to the direction in which radio waves are emitted from the antenna pattern 340a. When viewed from the +Z direction (imaging optical axis direction), the NC microphone 109c, the microphone substrate 430, and the relay substrate 321 are disposed so that they do not overlap the wireless antenna substrate 340 and they are distant from the wireless antenna substrate 340 by a predetermined distance. The predetermined distance is set to a distance at which radio waves emitted from antenna pattern 340a do not affect audio signals for the NC microphone 109c, microphone substrate 430, and relay substrate 321. Thereby, the radio waves emitted from the antenna pattern 340a can be prevented from being acquired as noise by the NC microphone 109c and the noise can be prevented from being included in the recorded sound. The distance at which the radio waves emitted from the antenna pattern 340a do not affect the audio signals can be calculated through simulation or experiment.

This embodiment provides an electromagnetic shielding member 480 such as a magnetic shielding sheet for shielding radio waves between the wireless antenna substrate 340 and the NC microphone 109c. The shielding member 480 is adhered and fixed to the second holding member 450 with double-sided tape. Thereby, the radio waves emitted from the antenna pattern 340a can be more effectively prevented from being acquired as noise by the NC microphone 109c without increasing the size of the camera 100.

This embodiment can acquire a proper signal through the third microphone even though the image pickup apparatus has a simple structure.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-137233, filed on Aug. 30, 2022, which is hereby incorporated by reference herein in its entirety.

What is claimed is:

1. An image pickup apparatus configured to record sound, the image pickup apparatus comprising:
   a housing;
   a first microphone and a second microphone configured to acquire stereophonic sound, and disposed at positions laterally separated from each other; and
   a third microphone separate from the first microphone and the second microphone,
   wherein the housing unit includes:
   a first holder and a second holder separated from each other,
   a wireless antenna substrate having an antenna configured to emit radio waves; and
   a signal transmission substrate configured to transmit a signal from the third microphone, and
   wherein the first microphone is disposed in the first holder,
   wherein the second microphone and the third microphone are disposed in the second holder, and
   wherein the third microphone and the signal transmission substrate are disposed opposite to a direction in which the antenna emits the radio waves.

2. The image pickup apparatus according to claim 1, wherein the housing includes a housing portion, a first member, and a second member, the first member and the second member being fixed into the housing portion at positions separated from each other, and
   wherein the first holder is formed by the first member, and the second holder is formed by the second member.

3. The image pickup apparatus of claim 1, further comprising an operation device operable by a user,
   wherein in the housing, the second holder is provided opposite to the operation device with respect to the first holder.

4. The image pickup apparatus according to claim 1, wherein the image pickup apparatus performs imaging through an imaging optical system including a driver configured to drive an optical element, and
   wherein in the second holder, the third microphone is disposed closer to the driver than the second microphone.

5. The image pickup apparatus according to claim 1, wherein the third microphone and the signal transmission substrate are disposed so as not to overlap the wireless antenna substrate when viewed from an imaging optical axis direction.

6. The image pickup apparatus according to claim 1, further comprising an electromagnetic shielding member disposed between the third microphone and the wireless antenna substrate.

7. The image pickup apparatus according to claim 1, wherein each of the second microphone and the third microphone has a sound hole at a position shifted from a center of each microphone, and
   wherein the second microphone and the third microphone are disposed such that the sound hole of the second microphone is located on a side of the third microphone, and the sound hole of the third microphone is located on a side of the second microphone.

8. The image pickup apparatus according to claim 1, wherein in the housing, a member forming the second holder is fixed to a housing portion by a fastening member, and
   wherein the fastening member is provided inside an arrangement width of the second microphone and the third microphone.

9. The image pickup apparatus according to claim 1, wherein the housing has microphone holes for acquiring sound at positions corresponding to the first microphone and the second microphone in a housing portion, and
   wherein the microphone holes are not provided at a position corresponding to the third microphone.

10. The image pickup apparatus according to claim 1, further comprising a processor configured to execute instructions to process stereophonic sound signals from the first microphone and the second microphone using a signal from the third microphone.

11. An image pickup apparatus configured to record sound, the image pickup apparatus comprising:
    a housing;
    a first microphone and a second microphone configured to acquire stereophonic sound, and disposed at positions laterally separated from each other; and
    a third microphone separate from the first microphone and the second microphone,
    wherein the housing includes a first holder and a second holder separated from each other;
    wherein the first microphone is disposed in the first holder,
    wherein the second microphone and the third microphone are disposed in the second holder,
    wherein in the housing, a member forming the second holder is fixed to a housing portion by a fastening member, and
    wherein the fastening member is provided inside an arrangement width of the second microphone and the third microphone.

12. The image pickup apparatus according to claim 11, wherein the housing includes a housing portion, a first member, and a second member, the first member and the second member being fixed into the housing portion at positions separated from each other, and
    wherein the first holder is formed by the first member, and the second holder is formed by the second member.

13. The image pickup apparatus of claim 11, further comprising an operation device operable by a user,
    wherein in the housing, the second holder is provided opposite to the operation device with respect to the first holder.

14. The image pickup apparatus according to claim 11, wherein the image pickup apparatus performs imaging through an imaging optical system including a driver configured to drive an optical element, and
    wherein in the second holder, the third microphone is disposed closer to the driver than the second microphone.

15. The image pickup apparatus according to claim 11, wherein the housing includes:
    a wireless antenna substrate having an antenna configured to emit radio waves; and
    a signal transmission substrate configured to transmit a signal from the third microphone, and
    wherein the third microphone and the signal transmission substrate are disposed opposite to a direction in which the antenna emits the radio waves.

16. The image pickup apparatus according to claim 15, wherein the third microphone and the signal transmission substrate are disposed so as not to overlap the wireless antenna substrate when viewed from an imaging optical axis direction.

17. The image pickup apparatus according to claim 15, further comprising an electromagnetic shielding member disposed between the third microphone and the wireless antenna substrate.

18. The image pickup apparatus according to claim 11,
    wherein each of the second microphone and the third microphone has a sound hole at a position shifted from a center of each microphone, and
    wherein the second microphone and the third microphone are disposed such that the sound hole of the second microphone is located on a side of the third microphone, and the sound hole of the third microphone is located on a side of the second microphone.

19. The image pickup apparatus according to claim 11,
    wherein the housing has microphone holes for acquiring sound at positions corresponding to the first microphone and the second microphone in the housing portion, and
    wherein the microphone holes are not provided at a position corresponding to the third microphone.

20. The image pickup apparatus according to claim 11, further comprising a processor configured to execute the instructions to process stereophonic sound signals from the first microphone and the second microphone using a signal from the third microphone.

* * * * *